United States Patent [19]

Dallinger

[11] Patent Number: 4,678,129

[45] Date of Patent: Jul. 7, 1987

[54] PADDLE WHEEL ASSEMBLY FOR FORAGE HARVESTERS

[75] Inventor: James F. Dallinger, Narvon, Pa.

[73] Assignee: New Holland Inc., New Holland, Pa.

[21] Appl. No.: 849,669

[22] Filed: Apr. 9, 1986

[51] Int. Cl.$^4$ ............................................. B02C 21/02
[52] U.S. Cl. ................................. 241/101.7; 56/14.3; 241/222; 241/285 B
[58] Field of Search .................. 241/101.7, 222, 60, 241/285 B; 56/13.3, 13.4, 13.9, 14.3

[56] References Cited

U.S. PATENT DOCUMENTS

| | | | |
|---|---|---|---|
| 2,947,129 | 8/1960 | Kowalik | 56/13.3 X |
| 3,752,411 | 8/1973 | Blanshine . | |
| 3,985,306 | 10/1976 | Wagstaff et al. . | |
| 4,223,846 | 9/1980 | Priepke et al. . | |
| 4,263,772 | 4/1981 | Phillips et al. . | |
| 4,345,417 | 8/1982 | deBuhr et al. . | |
| 4,383,652 | 5/1983 | Osborne et al. . | |

FOREIGN PATENT DOCUMENTS 486049 10/1953 Italy ................................ 241/222

*Primary Examiner*—Mark Rosenbaum
*Attorney, Agent, or Firm*—Darrell F. Marquette; Frank A. Seemar; Larry W. Miller

[57] ABSTRACT

A crop processor for forage harvesters includes a paddle wheel assembly for replacing the lower compressor roll of a compressor roll assembly. The paddle wheel assembly includes paddles arranged to convey crop material that has been previously cut and chopped by a cutterhead toward a discharge blower while causing only minimal further conditioning of the cut and chopped crop material. When harvesting grass crops such as alfalfa, the paddle wheel assembly prevents plugging of the crop processor.

9 Claims, 6 Drawing Figures

PADDLE WHEEL ASSEMBLY FOR FORAGE HARVESTERS

BACKGROUND AND SUMMARY OF THE INVENTION

The present invention relates generally to forage harvester crop processors and, more particularly, to forage harvester crop processors of the type having a pair of compressor rolls mounted between a cutterhead and a blower.

Forage harvester crop processors are used to receive crop material harvested from the field and to cut and chop it into forage which is fed via a blower to a temporary storage bin or wagon to subsequently be fed to livestock. A common form of forage harvester utilized for this purpose employs a cylindrical type cutterhead which cooperates with a shearbar to cut and chop crop material as it is fed over the shearbar. Although a variety of crops are processed by forage harvesters, one of the more common crops is corn.

It is not uncommon while processing corn with a forage harvester of the type having a cylindrical cutterhead for less than half of the corn kernels to be cracked or cut during the processing. It has been learned that when uncracked or uncut corn kernels are subsequently fed to cattle, the cattle may not be able to utilize the full food value of the chopped corn. This is because the digestive system of cattle is such that they will not digest all of the corn kernels if some of the kernels have not been cracked or cut.

In view of the above, it has been necessary in the past to additionally condition corn before it is fed to cattle. One system of additionally conditioning corn utilizes transverse cracking bars of the type disclosed in U.S. Pat. No. 3,752,411 issued Aug. 14, 1973, in the name of A. W. Blanshine. Other prior art systems include the use of recutter screens and hammermills. Still another system contemplates a pair of cooperating upper and lower compressor rolls mounted in close proximity to the cutterhead and adapted to receive crop material and crack kernels of corn prior to conveyance to a discharge blower such as shown in U.S. Pat. No. 4,345,417 issued Aug. 24, 1982, to Harold deBuhr et al.

While the general type of machine disclosed in the above-mentioned deBuhr et al patent provides satisfactory results when processing corn, it encounters problems when used for processing grass crops such as alfalfa. In particular, the problems encountered are plugging of the compressor rolls, excessive horsepower requirement, and reduced capacity. One solution to these problems is to entirely remove both of the compressor rolls before processing grass crops. This solution is unacceptable because it is very difficult and time consuming to remove the upper compressor roll. Another attempt at solving these problems has been to remove only the lower compressor roll and replace it with a floor pan. This attempt has proven unsuccessful because some plugging still occurs in the area between the upper compressor roll and the floor pan, thereby requiring excessive horsepower and reducing capacity.

It is an object of the present invention to provide a forage harvester crop processor which satisfactorily processes corn and which is easily and quickly converted to process grass crops without plugging, without requiring excessive horsepower, and without reducing capacity.

The forage harvester crop processor of the present invention includes means for cutting and chopping crop material, a compressor roll assembly for further conditioning crop material that has been previously cut and chopped by the cutting and chopping means, and means for discharging crop material that has been further conditioned by the compressor roll assembly. While the compressor roll assembly normally comprises upper and lower compressor rolls arranged to further condition crop material therebetween, the present invention provides a paddle wheel assembly for replacing one of the compressor rolls. The paddle wheel assembly includes paddles for conveying cut and chopped crop material from the cutting and chopping means to the discharging means while causing only minimal further conditioning of the cut and chopped crop material.

In the preferred embodiment of the present invention, the paddle wheel assembly replaces only the lower compressor roll and includes a shaft with a pair of hubs mounted thereon. The paddles are mounted on the shaft between the hubs. A pair of plates are each preformed to wrap partially around the shaft, and each of the plates has a flat portion extending outwardly tangentially from the shaft to define one of the paddles. Preferably, the paddles are arranged approximately 180° apart with respect to the axis of the shaft.

DETAILED DESCRIPTION OF THE PREFERRED EMBODIMENT

Figure 1:
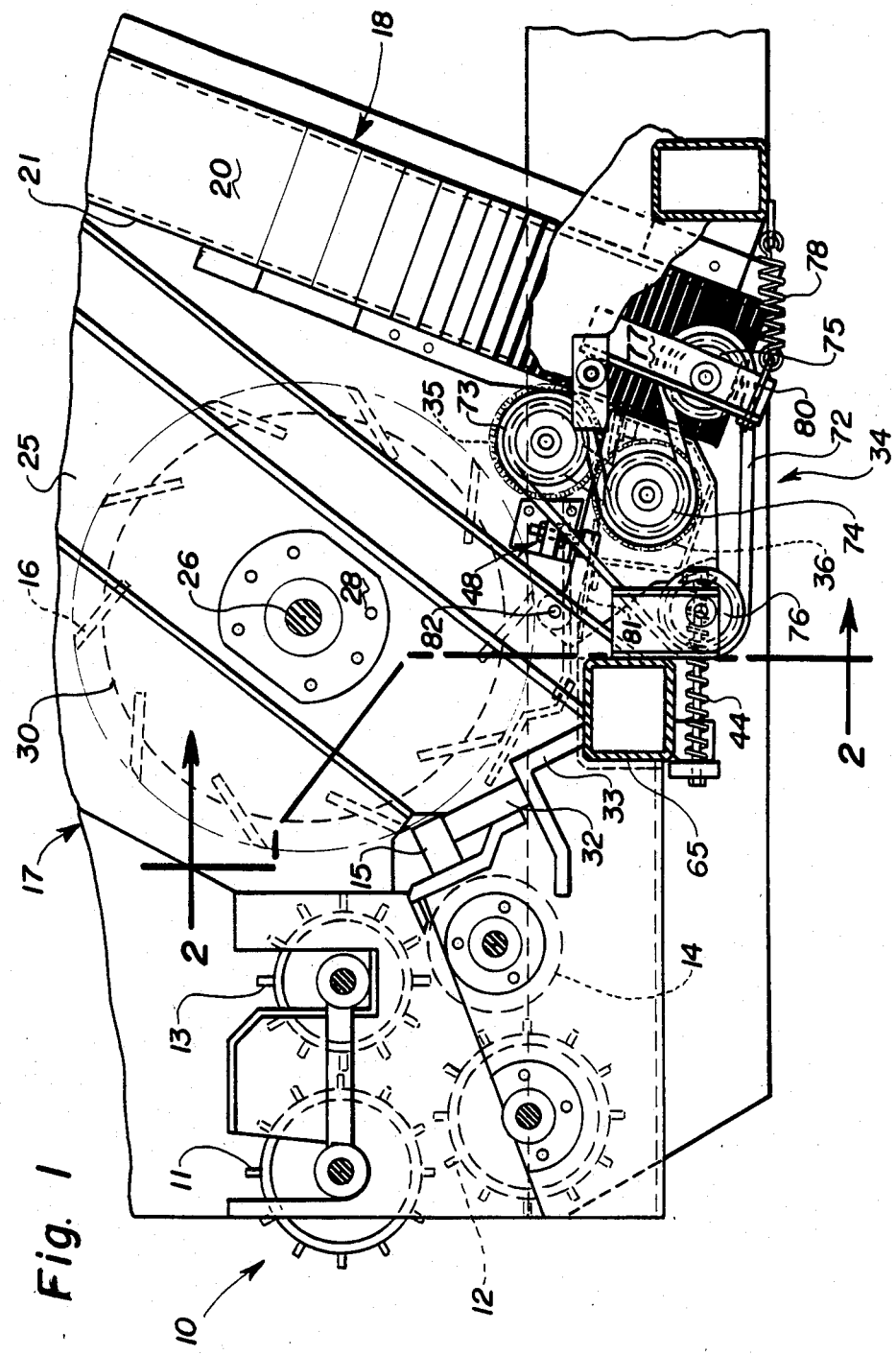
FIG. 1 is a side elevational view of a forage harvester crop processor unit in which the present invention is embodied.

Referring now to the drawings and, more particularly to FIG. 1, a side elevational view of a precision type forage harvester crop processor can be seen. Processors of this type are commonly embodied in forage harvesters, an example of which is shown in U.S. Pat. No. 4,223,846 issued Sept. 23, 1980, to Edward H. Priepke et al. Forage harvesters are generally known and will not be described in detail for the purposes of this application, however, they commonly include a mobile frame supported by wheels and are driven by a power unit. Crop gathering headers are mounted on the frame at the forward end of forage harvesters for collecting, consolidating and conveying crop material to the infeed of the crop processor.

Now turning more particularly to the crop processor depicted in FIG. 1, and generally designated by reference numeral 10, an upper front feed roll 11 cooperates with a lower front feed roll 12 to convey crop material rearwardly to cooperating upper and lower rear feed rolls 13,14 respectively. The feed rolls 11,12,13,14 consolidate the crop material into a mat having a generally rectangular cross section and present it across a shearbar 15 which in turn cooperates with a plurality of cutterhead knives 16 mounted on the periphery of a rotating cutting mechanism 17 to comminute crop material by commonly known shearing action. Although a self-propelled forage harvester has been referred to above, the type of crop processing apparatus involved can also be used in pull-type forage harvesters wherein the power is derived from a source independent of the harvester, such as a tractor.

A rotary crop discharge blower 18 is mounted rearward of rotating cutting mechanism 17 and in the embodiment shown in FIG. 1, is aligned in a plane tilted at an acute angle to the vertical. It should be realized that even though the tilted angle of the blower 18 is an important relationship for the preferred embodiment of this invention, the invention is not limited to applications where the crop discharge means is not in a vertical plane. The crop discharge blower 18 has a generally circular housing 20 in which a plurality of well known crop engaging blades (not shown) are rotatably mounted. The crop engaging blades engage crop material entering the front planar wall 21 via access opening 22 defined by upper and lower edges 23,24, respectively. Sufficient energy is imparted to the crop material by the blades for discharging the crop material upwardly and rearwardly through a discharge spout, not shown, to a trailing temporary storage container, such as a wagon.

Figure 2:
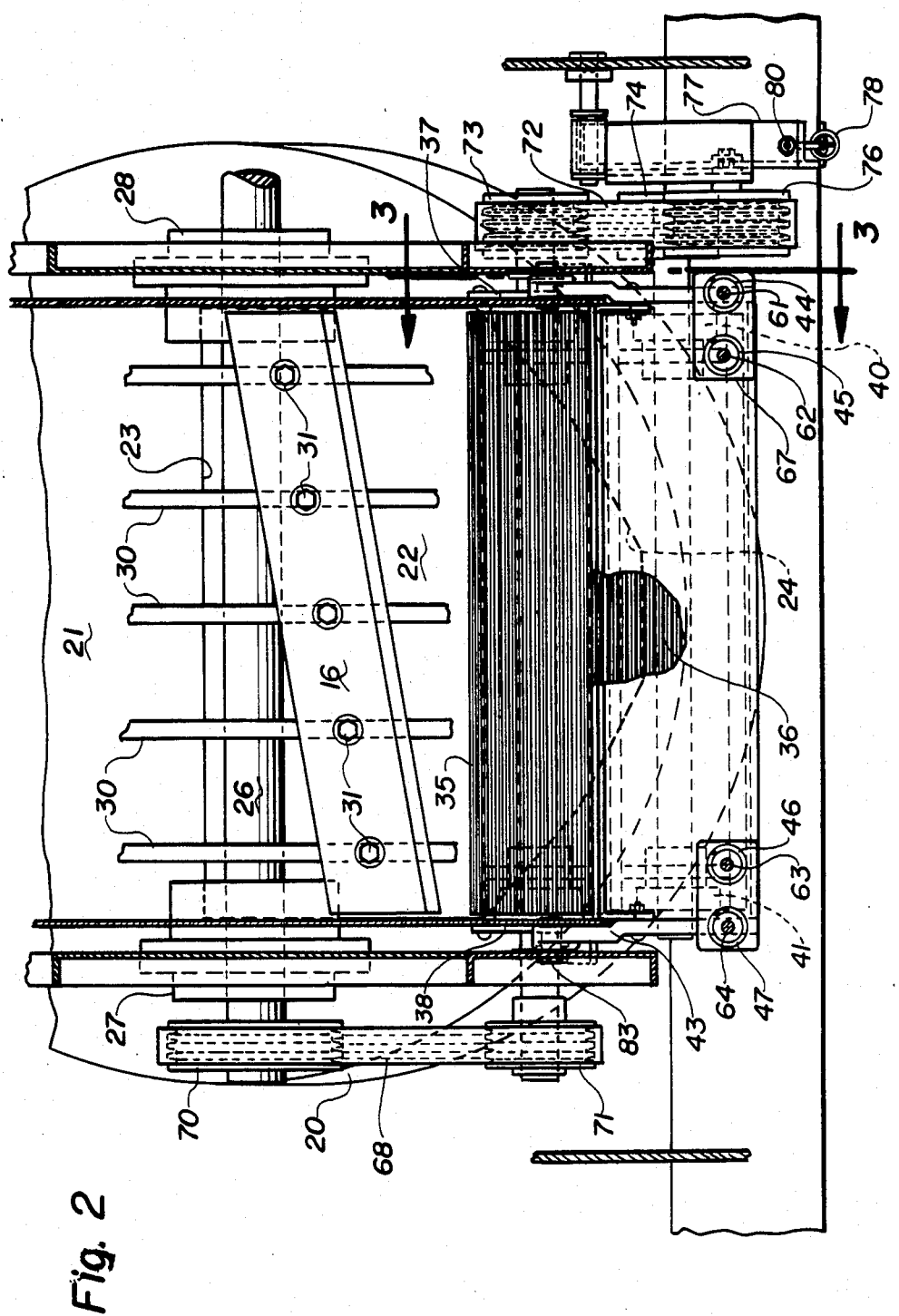
FIG. 2 is a fragmentary elevational view taken along lines 2—2 of FIG. 1.

Cutting mechanism 17, mounted forwardly of and aligned with blower 18, (see FIG. 2), includes a housing 25, in which the rotating cutterhead shaft 26 is journalled for rotation in bearing assemblies 27,28 about a generally transverse axis along shaft 26. The plurality of knives 16 (shown in phantom outline in FIG. 1), one of which is shown in FIG. 2, are mounted laterally askew on a series of side-by-side disc members 30 by means of bolts 31. The knives 16 are peripherally disposed on members 30 such that upon rotation about shaft 26 knives 16 generate a cylinder and the cutting edges thereof pass in close proximity to shearbar 15. Thus, crop material being fed in a general mat configuration toward cutting mechanism 17 by feed rolls 13,14 passes over shearbar 15 and is cut and chopped into relatively small particles by the peripherally mounted cutterhead knives 16 in shearing engagement with shearbar 15. Shearbar 15 is typically stationarily mounted on the frame through a mounting block 32 and bracket 33. Although not shown for the purposes of this application, shearbars of this nature are commonly mounted for adjustment to permit selective movement of the shearbar toward and away from cutterhead knives to maintain proper relative positioning for effective shearing action.

Figure 3:
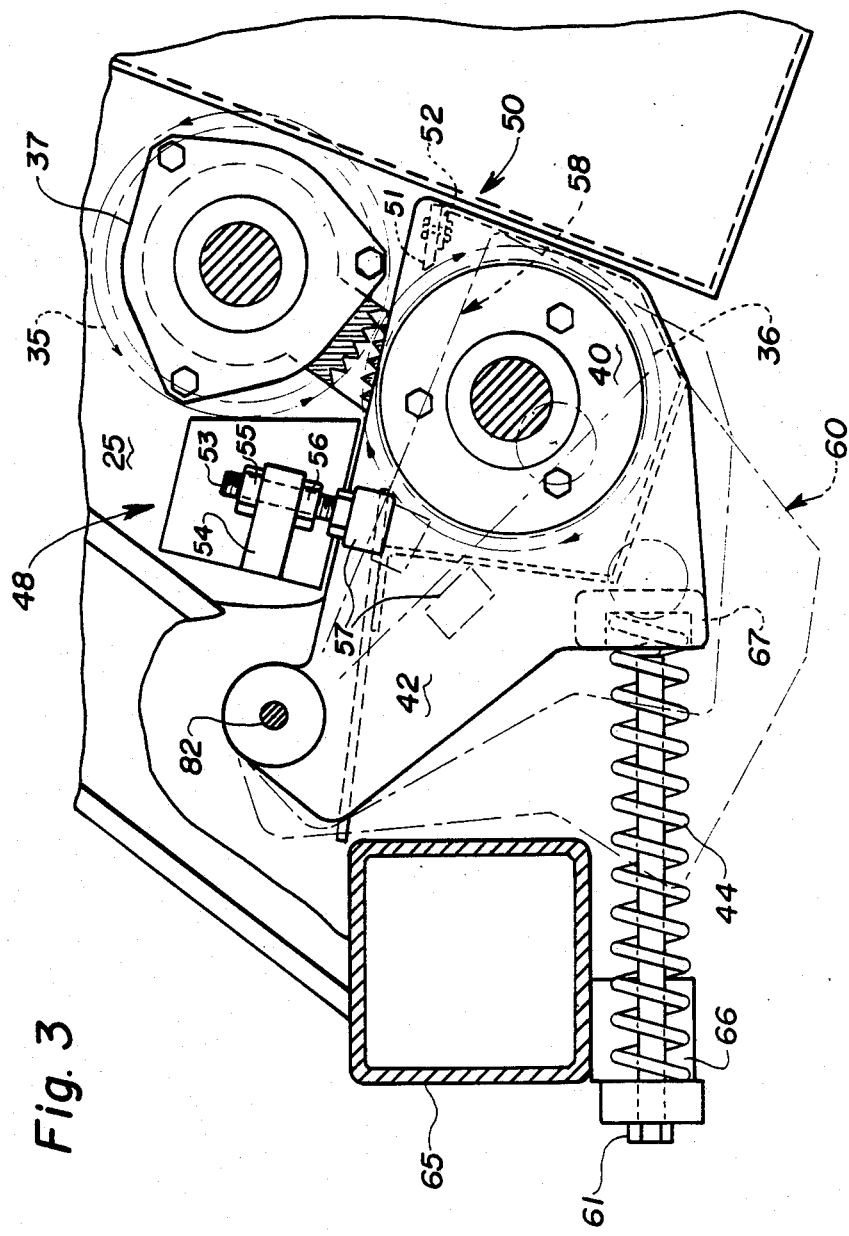
FIG. 3 is an enlarged side elevational view taken along lines 3—3 of FIG. 2.

A cavity having a general wedge-shape configuration is defined by the front planar wall 21 of blower 20 and the peripheral path of the cutterhead knives 16 as they travel upwardly and rearwardly in front of blower housing 20. Disposed in this cavity is a compressor roll assembly 34 comprising upper roll 35 and lower roll 36 mounted along horizontal axes which are in a plane that is generally parallel to the face of blower 18. These rolls 35,36 have serrated outer surfaces as seen in FIGS. 2 and 3 of the type common in roller mills used for processing corn kernels. Upper roll 35 is rotatably mounted in housing 25 in fixed bearing assemblies 37,38, one of which is shown in FIG. 3. Lower compressor roll 36 is mounted with its outer surface adjacent but not in contact with outer surface of upper compressor roll 35. Lower roll 36 is journalled for rotation in bearing assemblies 40,41, one of which is also shown in FIG. 3.

Bearing assemblies 40,41 for lower compressor roll 36 are mounted on a pair of pivotally movable support brackets 42,43 held in place by a series of springs 44,45,46,47 urging brackets 42,43 upwardly and rearwardly against adjustable stop mechanisms 48 (only one shown). Also included in compressor roll assembly 34 is a conventional scraping means 50 consisting of a scraper blade 51 mounted adjacent the periphery of the lower compressor roll 36 by means of a mounting bracket 52. The adjustable stop mechanisms 48 each include a bolt 53 (see FIG. 3) adjustably mounted in support member 54 by sequentially rotatable nuts 55 and 56 for locking bolt 53 in any position desired relative to an abutting member 57 which is integral with brackets 42,43. Phantom position 58 of bracket 42 (FIG. 3) illustrates the maximum position at which lower roll 36 can be adjusted with respect to upper compressor roll 35. Also shown in FIG. 3 is a phantom position 60 of bracket 42 illustrating the position at which the brackets 42,43 can be pivoted for moving the lower compressor roll 36 to a non-operative position. For pivoting the brackets 42,43 to this phantom position 60, springs 44,45,46,47 must be removed from their engaged position. These springs are held under compression by bolts 61,62,63,64 urged against collars affixed to frame element 65 via integral flanges 66, see FIG. 3. The spring force is applied against collar members 67 integrally formed with brackets 42,43. For convenience, only the right side bracket 42 and associated pivotal elements are described, however, a similar opposing arrangement is provided on the left side of the mounting assembly for the lower compressor roll 36.

Drive for the crop processor 10 includes a main drive system derived from the power unit to drive the cutting mechanism 17. The drive belt 68 trained about the sheave 70 on the cutterhead shaft 26 is trained also about the smaller sheave 71 on the shaft of the upper compressor roll 35. Accordingly, upper compressor roll 35 is driven at an increased speed and this rotative drive force is transmitted through the upper compressor roll 35 which in turn drives the lower compressor roll 36 via belt 72. Belt 72 is trained from sheave 73 on the upper compressor roll 35 to the sheave 74 on the lower compressor roll 36 and thence about idler sheaves 75,76. Idler sheave 75 is mounted on a bracket 77 which is pivotally adjustable via spring 78 and take up bolt 80 to maintain tension in belt 72. Typical speeds for the cutting mechanism 17 are in the range of 850 RPM while the rolls 35,36 are driven substantially faster, i.e., in the range of 4000 RPM.

In operation, crop material is fed to the front and rear feed rolls 11,12,13,14 which in turn guide a mat of crop material across shearbar 15 which as noted above cooperatively provides the shearing action with cutterhead knives 16 to cut and chop the crop material into small particles. The cut and chopped crop material is then conveyed downwardly and rearwardly and propelled in a path toward the blower 18 in the general direction of compressor roll assembly 34. A lower guide pan 81 is provided along this path. As mentioned above, it is typical for compressor rolls 35,36 to rotate four or five times the speed of the cutting mechanism 17 which aids in the effective propulsion of crop material to the blower 18 and thereby helps prevent plugging of the compressor rolls 35,36. In the event access to the compressor roll assembly becomes necessary, belt 72 is removed from sheaves 73,74 and sheaves 75,76 by releasing the tension on the spring 78. Holding springs 44,45,46,47 are then removed and brackets 42,43 pivot downwardly via gravity to phantom position 60, shown in FIG. 3. This permits ready access to the blower fan blades for inspection or adjustment as required. It also permits inspection and cleaning of compressor rolls 35,36.

If it becomes necessary to completely remove the lower compressor roll 36 and its mounting assembly, pins 82 and 83, about which brackets 42 and 43 pivot, are slidably removed and the mounting assembly including the lower roll 36 can then be removed for inspection, repair, adjustment or the like. Operation of the processor 10 can be quickly and efficiently resumed by merely returning the brackets 42,43 to their pivotal position via pins 82,83 and then pivoting them upwardly toward the stop mechanisms 48 at which point, springs 44,45,46,47 are returned to their normal positions, belt 72 is rethreaded about sheaves 73,74 and sheaves 75,76 and spring 78 returns the tension to the belt 72 by turning bolt 80.

Figure 4:
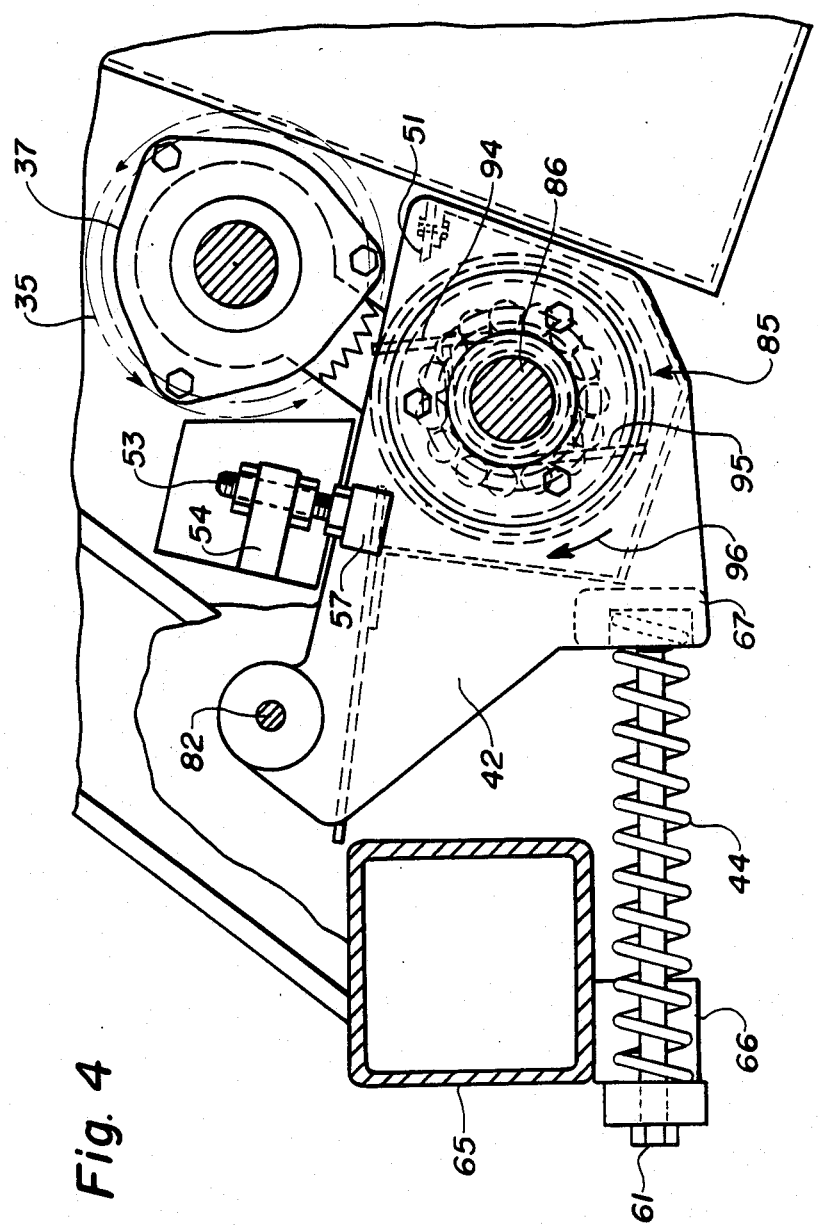
FIG. 4 is a view similar to FIG. 3 with the paddle wheel assembly of the present invention installed.
Figures 5, 6:
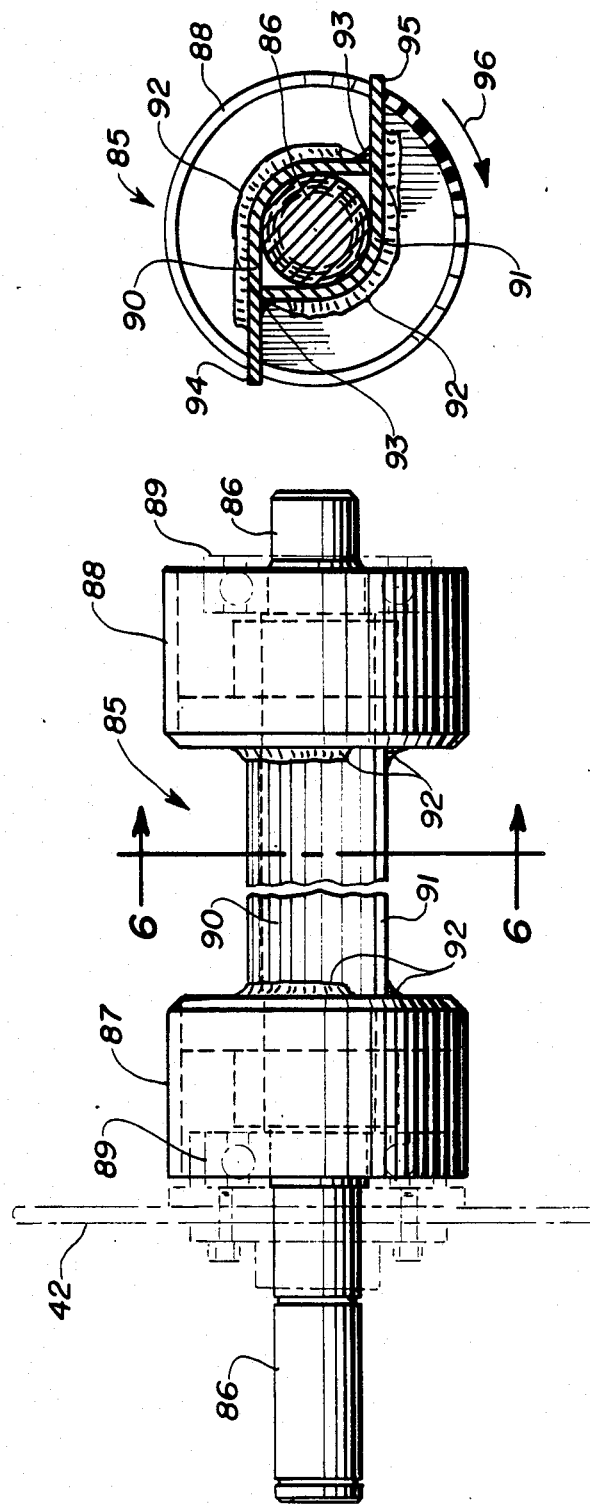
FIG. 5 is a front view of the paddle wheel assembly of the present invention.
FIG. 6 is a sectional view taken along lines 6—6 of FIG. 5.

Referring to FIG. 4, it will be seen that the lower compressor roll 36 and its bearing assemblies 40,41 (shown in FIGS. 1-3) have been removed from the brackets 42,43 and replaced with a paddle wheel assembly 85 in accordance with the preferred embodiment of the present invention. As also seen in FIGS. 5 and 6, the paddle wheel assembly 85 consists of a shaft 86 with hubs 87,88 fixed thereto. The hubs 87,88 are provided with bearings 89. Plates 90,91 are each performed to wrap partially around the shaft 86 and are secured to the hubs 87,88 by welds 92. The plates 90,91 are also secured to each other by welds 93.

Each of the plates 90,91 has a flat portion extending outwardly tangentially from the shaft 86 to define paddles 94,95. The paddles 94,95 are arranged approximately 180° apart with respect to the axis of shaft 86 which is also the axis of rotation of the paddle wheel assembly 85. In FIGS. 5 and 6, the arrow 96 denotes the normal direction of rotation of the paddle wheel asembly 85 which is opposite the direction of rotation of the upper compressor roll 35.

When the paddle wheel assembly 85 is installed in the forage harvester processor 10 of FIG. 1, the bolts 53 of the adjustable stop mechanisms 48 are adjusted so that there is some clearance between the tips of the paddles 94,95 and the serrated outer surface of the upper compressor roll 35. The paddles 94,95 serve to convey cut and chopped material into the blower 18 with only minimal further conditioning of the cut and chopped material. This is particularly important when harvesting grass crops because such further conditioning is undesirable and unnecessary. Crop flow into the blower 18 is increased and power consumption is significantly reduced since only minimal additional crop conditioning is done with the paddle wheel assembly 85 installed.

The removal of the lower compressor roll 36 and its bearing assemblies 40,41 and the subsequent installation of the paddle wheel assembly 85 is relatively easy and quick when compared to the procedure for removing the entire compressor roll assembly 34. Even though the paddle wheel assembly 85 is intended primarily for use in harvesting grass crops, it may also be used when harvesting corn if capacity becomes more important than crop conditioning.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a forage harvester crop processor having means for cutting and chopping crop material, a compressor roll assembly for further conditioning crop material that has been previously cut and chopped by said cutting and chopping means, said compressor roll assembly including upper and lower compressor rolls arranged to condition crop material therebetween, one of said compressor rolls being removably mounted on support means which is movable to facilitate removal of said compressor roll from the forage harvester crop processor, and means for discharging crop material that has been further conditioned by said compressor roll assembly, the improvement comprising:
a paddle wheel assembly removably mountable on said support means for replacing said one compressor roll, said paddle wheel assembly including paddles for conveying cut and chopped crop material from said cutting and chopping means to said discharging means while causing only minimal further conditioning of the cut and chopped material.

2. The improvement of claim 1, wherein said paddle wheel assembly replaces only said lower compressor roll.

3. The improvement of claim 2, wherein said paddle wheel assembly also includes a shaft with a pair of hubs mounted thereon, and wherein said paddles are mounted on said shaft between said hubs.

4. The improvement of claim 3, wherein said paddle wheel assembly includes a pair of plates each preformed to wrap partially around said shaft and each having a flat portion extending outwardly tangentially from said shaft to define one of said paddles.

5. The improvement of claim 4, wherein said paddles are arranged approximately 180° apart with respect to the axis of said shaft.

6. The improvement of claim 2, wherein said paddle wheel assembly is adjustably positioned so that the clearance between the tips of said paddles and the outer surface of said upper compressor roll may be adjusted.

7. The improvement of claim 6, wherein said support means comprises a pair of pivotally moveable brackets.

8. The improvement of claim 1, wherein said cutting and chopping means comprises a rotatable cutterhead having a plurality of knives cooperating with a stationary shearbar to cut and chop crop material.

9. The improvement of claim 1, wherein said discharging means comprises a rotary blower.

* * * * *